United States Patent
Roy et al.

(10) Patent No.: US 11,030,646 B1
(45) Date of Patent: Jun. 8, 2021

(54) COMPUTER PROGRAM PRODUCT THAT IMPLEMENTS A MACHINE LEARNING PROCESS USING A RANDOM FOREST MODEL FOR PREDICTING ADVERTISEMENT SPENDING

(71) Applicant: Alphonso Inc., Mountain View, CA (US)

(72) Inventors: Sartaki Sinha Roy, West Bengal (IN); Susmita Ghose, Mountain View, CA (US)

(73) Assignee: ALPHONSO INC., New York, NY (US)

( * ) Notice: Subject to any disclaimer, the term of this patent is extended or adjusted under 35 U.S.C. 154(b) by 0 days.

(21) Appl. No.: 17/026,585

(22) Filed: Sep. 21, 2020

(51) Int. Cl.
*G06Q 30/02* (2012.01)
*G06N 20/00* (2019.01)

(52) U.S. Cl.
CPC ......... *G06Q 30/0249* (2013.01); *G06N 20/00* (2019.01); *G06Q 30/0247* (2013.01); *G06Q 30/0276* (2013.01)

(58) Field of Classification Search
CPC ........... G06Q 30/0249; G06Q 30/0247; G06Q 30/0276; G06N 20/00
USPC ......................................... 705/14.48; 725/14
See application file for complete search history.

(56) References Cited

U.S. PATENT DOCUMENTS

| | | | |
|---|---|---|---|
| 10,706,286 B1 | 7/2020 | Muhamed et al. | |
| 2015/0089523 A1* | 3/2015 | Volovich | H04H 60/66 725/14 |
| 2015/0161662 A1* | 6/2015 | Minor | G06Q 30/0275 705/14.48 |
| 2016/0210661 A1* | 7/2016 | Chittilappilly | G06Q 30/0246 |

FOREIGN PATENT DOCUMENTS

CN 108093275 A * 5/2018

OTHER PUBLICATIONS

Yu Chen, Random Forest and Ensemble Methods for YouTube Brand Lift Forecasting, 2019 (Year: 2019).*
Yiu, T. "Understanding Random Forest: How the Algorithm Works and Why It is So Effective." Toward Data Science, published Jun. 12, 2019, 11 pages.

* cited by examiner

Primary Examiner — Tarek Elchanti
(74) Attorney, Agent, or Firm — Panitch Schwarze Belisario & Nadel LLP (57) ABSTRACT

A computer program product is provided for predicting ad spend for a specific media program aired or streamed on a specific network at a specific date and time using a database of media program data that includes known ad spend for a subset of media programs, and viewership data for each of the media programs, including total viewership and viewership ratings. Each of the media programs is identified by its respective network, and date and time of airing or streaming. A random forest model is trained to predict ad spend using variables that are identified as being correlated with ad spend. The trained random forest model is then used to predict ad spend for a specific media program that is aired or streamed on a specific network at a specific date and time, and which has an unknown ad spend.

1 Claim, 11 Drawing Sheets

| | tv_network | show_title | show_genres | month | daypart | timeblock | viewership | avg_rating | avg_cpm | airing_spend |
|---|---|---|---|---|---|---|---|---|---|---|
| 32 | ESPN | SportsNation | Sports talk | 1 | DAYTIME | 03:30 PM | 13509.0 | 0.30 | 12.110000 | 4345.0 |
| 84 | ESPN Deportes | SportsCenter | News;Sports talk | 3 | WEEKEND | 01:00 PM | 561.0 | 0.01 | 24.370001 | 292.0 |
| 151 | National Geographic | One Strange Rock | Documentary;Adventure; Nature;Science;History | 5 | LATE FRINGE | 10:00 PM | 11189.0 | 0.23 | 10.470000 | 2880.0 |
| 170 | CNBC | Mad Money | Bus./financial;News; Interview;How-to | 5 | EVENING NEWS | 05:00 PM | 6138.0 | 0.26 | 5.700000 | 1772.0 |
| 171 | NFL Network | NFL Total Access | Sports talk;Football | 5 | LATE FRINGE | 10:00 PM | 3594.0 | 0.07 | 7.770000 | 650.0 |
| 215 | MLB Network | MLB Baseball | Baseball | 6 | PRIME TIME | 07:00 PM | 13514.0 | 0.04 | 10.480000 | 502.0 |
| 294 | ESPN | SportsCenter | News;Sports talk | 8 | LATE FRINGE | 10:00 PM | 26273.0 | 0.54 | 20.480000 | 13226.0 |
| 310 | NBCSN | Premier League Soccer | Soccer | 8 | WEEKEND | 08:30 AM | 6379.0 | 0.31 | 25.950001 | 9622.0 |
| 332 | ESPN2 | College Football | Football | 9 | WEEKEND | 11:00 AM | 40962.0 | 0.63 | 12.670000 | 9546.0 |

*Histogram of average cpm, average rating and ad spend*

*Figure 6*

*Scatter plot of log(ad spend) vs other variables*

*Figure 7*

Box plot of log(ad spend) across different time blocks in a day

*Figure 8*

*Box plot of log(ad spend) across different genres of TV shows*

*Figure 9*

*Cumulative plot of unique show coverage by genre*

*Figure 10*

*Scatter plot of log(ad spend) and median encoded network and time block*

Figure 11

COMPUTER PROGRAM PRODUCT THAT IMPLEMENTS A MACHINE LEARNING PROCESS USING A RANDOM FOREST MODEL FOR PREDICTING ADVERTISEMENT SPENDING

BACKGROUND OF THE INVENTION

Adspend (also, interchangeably referred to as "ad spend" or "advertisement spending") is the amount of money spent on advertising for a product or service. Advertisements, such as commercials, promote products or services. Companies negotiate with media providers, either directly, or via ad agencies, for the cost of running ads on media programs. For example, a 30 second ad (commercial) that appears in a media program on a particular network at a particular date and time will have a cost that must be paid by the advertiser, either directly or via the ad agency. This cost may be viewed as the "ad spend" for the commercial.

Companies often want to know what competitors are paying for their ad spend for a variety of business intelligence reasons. Other times, companies just want to know what the ad spend would be for them to run an ad on a particular network at a particular date and time. Ad spend data may thus be past looking (i.e., what was the ad spend for a particular ad that was run on a particular network at a particular previous date and time?), or forward looking (i.e., what would the ad spend be for a particular ad run on a particular network at a particular future date and time). Also, ad spend data, in conjunction with attribution data, is needed to calculate/predict return on ad spend (ROAS), which is effectively a return on investment (ROI) metric.

However, only a very small percentage of ad spend data is publicly available. Currently, that percentage is about 5% of total ad airings. This dearth of public information makes it very difficult for companies to predict the likely ad spend for a particular network at a particular date and time.

Accordingly, there is an unmet need for improved systems and methods that predict this ad spend with a high degree of accuracy based on only a very small amount of public information. The present invention fulfills this need.

SUMMARY OF THE PRESENT INVENTION

A computer program product is provided for predicting ad spend for a specific media program aired or streamed on a specific network at a specific date and time using a database of media program data that includes known ad spend for a subset of media programs, and viewership data for each of the media programs, including total viewership and viewership ratings. Each of the media programs is identified by its respective network, and date and time of airing or streaming. A random forest model is trained to predict ad spend using variables that are identified as being correlated with ad spend. The trained random forest model is then used to predict ad spend for a specific media program that is aired or streamed on a specific network at a specific date and time, and which has an unknown ad spend.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

1. Definitions

The following definitions are provided to promote understanding of the present invention.

Average Rating—A rating of 1 for a program would mean that 1% of all television-equipped households (that is, homes with a TV set, not total number of people), regardless of the TV being on or not, were tuned in to that program. Because ratings are based on samples, it is possible for shows to get a 0.0 rating, despite having an audience.

CPM—"Cost per mille," also referred to as "cost per thousand." CPM is a marketing term used to denote the price needed to obtain 1000 advertisement impressions. The "average CPM" refers to the average of the CPM during a particular time slot/timeblock.

Viewership—This is the number of unique IP addresses that viewed a program at a particular time block. The IP addresses may be captured from the media delivery devices (e.g., settop box) or the media viewing device (e.g., TV, mobile device).

2. Overview

Figure 1:
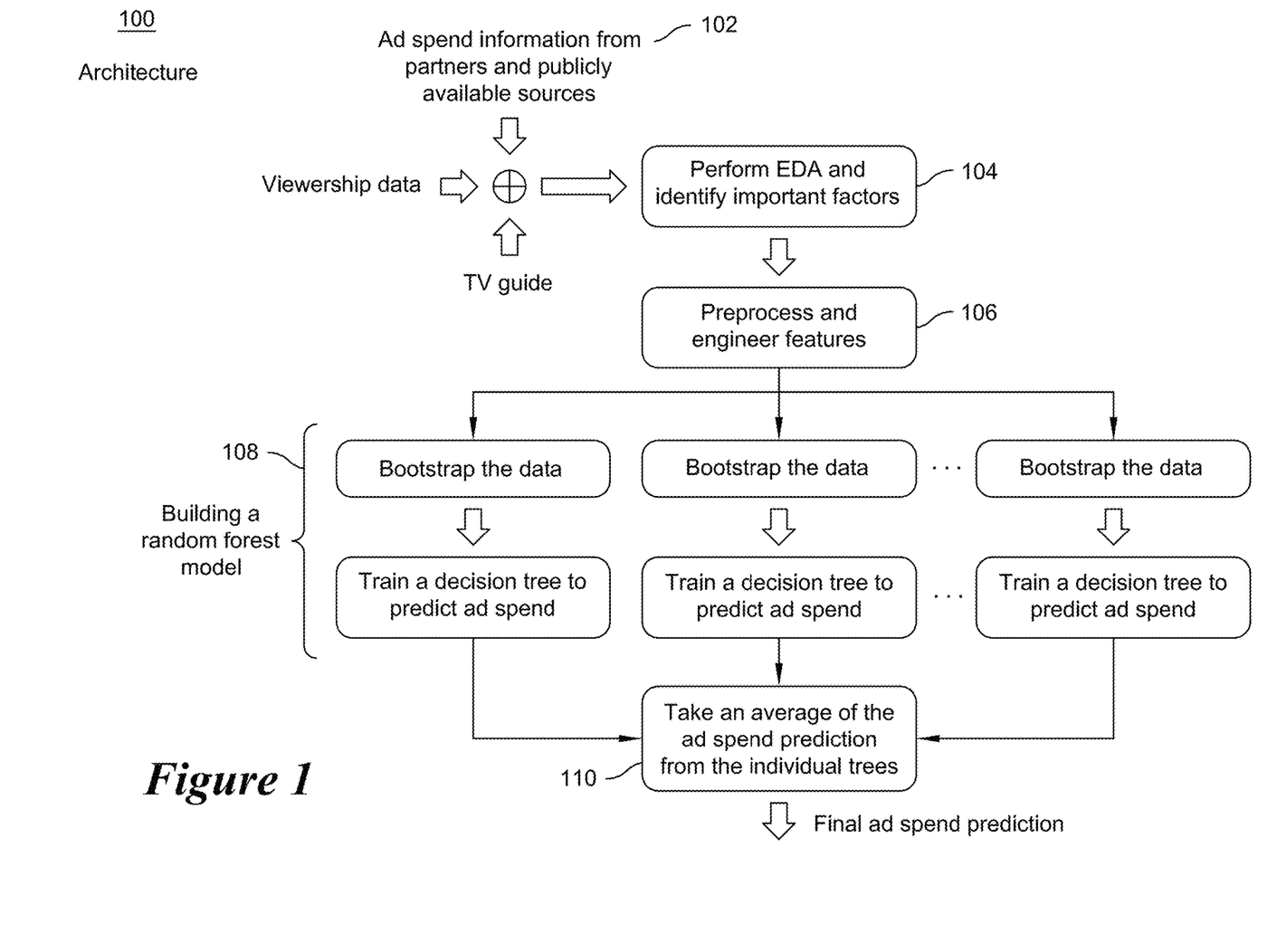
FIG. 1 is an architecture view of a flowchart of one preferred embodiment of the present invention.
Figure 2:
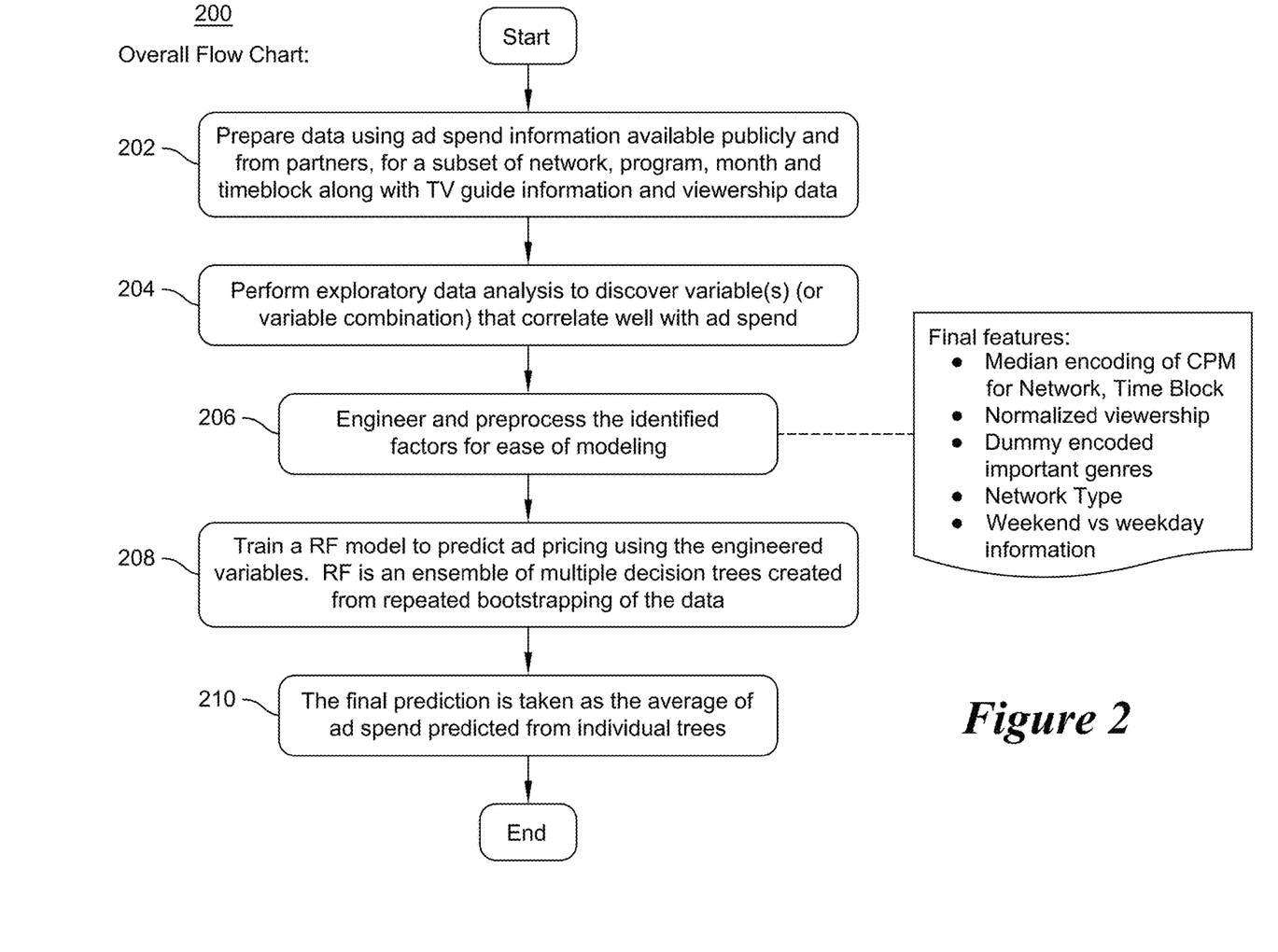
FIG. 2 is an overall flowchart of the steps in the flowchart of FIG. 1.

FIG. 1 is an architecture view of a flowchart 100 of one preferred embodiment of the present invention for predicting ad spend for a specific media program that is aired or streamed on a specific network at a specific date and time. FIG. 2 is an overall flowchart 200 of the steps in the flowchart 100. For convenience, FIGS. 1 and 2 are described together.

Step 102/202: Provide a database of media program data 102 that includes at least (i) known ad spend for a subset of media programs, and (ii) viewership data for each of the media programs, including total viewership and viewership ratings. Each of the media programs is identified by its respective network, and date and time of airing or streaming. "Aired" media programs refer to programs that are broadcast via (i) a conventional broadcast TV signal, typically delivered over a cable or fiber optic network via a set top box, CableCARD® or the like to a TV, or (ii) an over-the-air (OTA) broadcast TV signal. "Streamed" media programs refer to programs that are streamed during an internet-based viewing session.

Step 104/204: Perform exploratory data analysis on the media program data to identify one or more variables, or combinations of variables that correlate with ad spend. One aspect of this data analysis is to convert the date into related date data. For example, if the date is Jan. 3, 2020, the date is a weekday (as opposed to a weekend), and is a Friday. If the date is Jan. 5, 2020, the date is a weekend, and is a Sunday.

Step 106/206: Perform feature engineering on the identified one or more variables, or combinations of variables to identify a subset of one or more variables, or combinations of variables that provide the greatest explanatory value. In one preferred embodiment, the identified subset includes:
 i. median encoding of CPM for Network, Time Block
 ii. normalized viewership
 iii. dummy encoded important genres
 iv. network type
 v. weekend vs. weekday information Step 108/208: Train a random forest model to predict ad spend using the identified subset of one or more variables, or combinations of variables. The random forest model includes a random forest having a plurality of individual decision trees created from repeated bootstrapping of the data.

Step 110/210: Predict ad spend for a specific media program that is aired or streamed on a specific network at a specific date and time, and which has an unknown ad spend, using the random forest model, wherein the predicted ad spend is an average of ad spend predicted from the individual decision trees of the random forest.

3. Median CPM Encoding

As discussed above, median encoding of CPM is one of the variables that provide the greatest explanatory value. The available spend information represents a very small fraction in terms of the possible network, timeblock combination. Accordingly, a large portion of the Median CPM encoding needs to be estimated by imputation.

Figure 3:
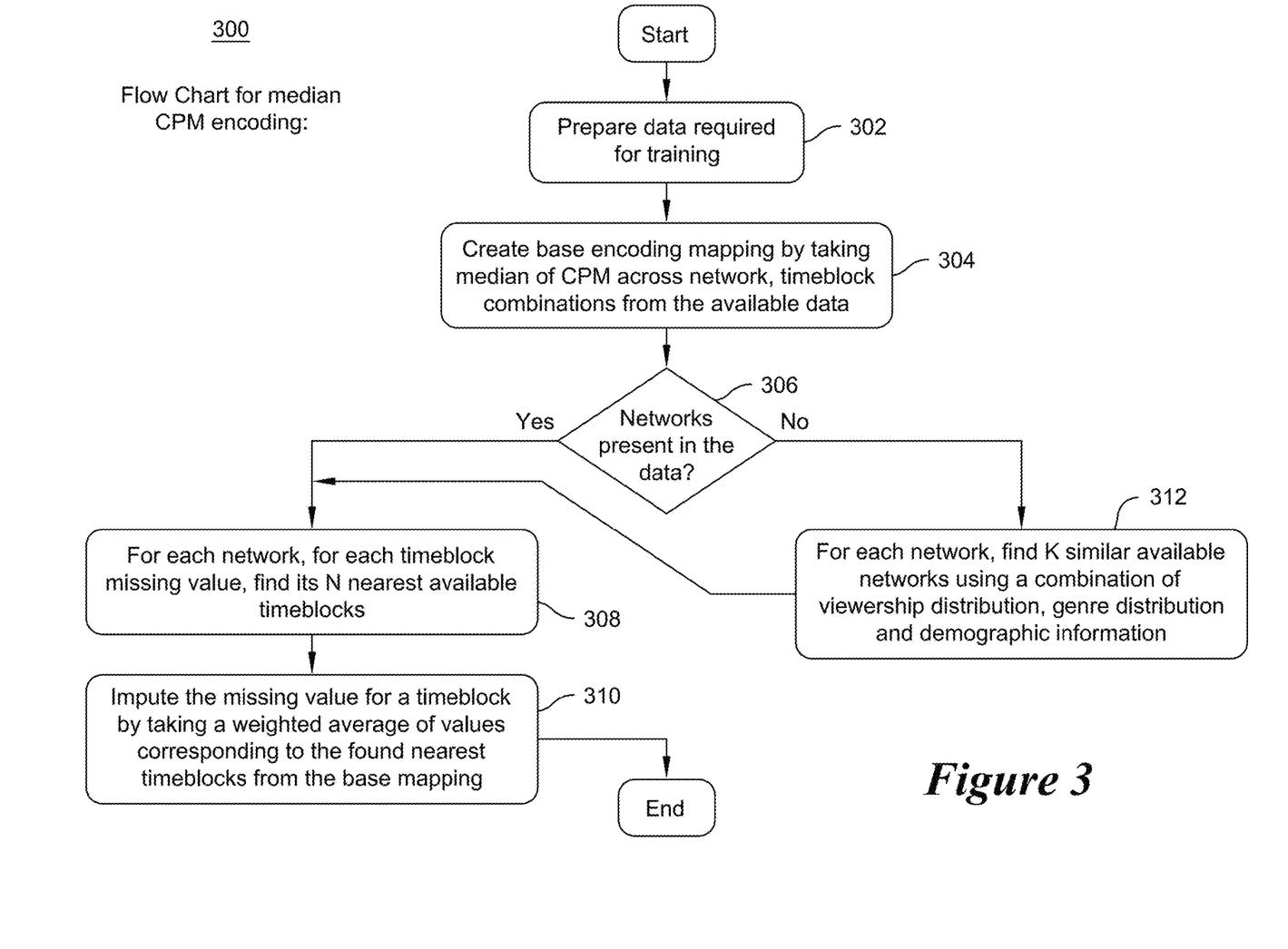
FIG. 3 is a flowchart of median CPM encoding in accordance with one preferred embodiment of the present invention.

FIG. 3 shows a flowchart 300 of one preferred embodiment for performing this estimate.

Step 302: Prepare data required for training.

Step 304: Create base encoding mapping by taking a median of CPM across network, timeblock combinations from the available (training) data.

Steps 306/308/310: For networks in which ad spend information is available for only some timeblocks, imputation is done by taking a weighted average of values from base mapping for N nearest available timeblocks. N is configurable. Weights take into account the distance of the closest timeblocks along with global variation of median CPM over timeblocks.

Steps 306/312: For networks for which no ad spend information is available, identify K similar available networks using a combination of viewership distribution, genre distribution and demographic information. Fill the values for timeblocks for the network by the method mentioned above using the identified similar networks.

4. Calculation of Ad Spend Information for Inputting into the Model

The data input in steps 102/202 of FIGS. 1 and 2 are obtained from a variety of sources. For example, service providers provide buy data (media costs) for selected programs, including Average Rating, Average CPM, Program Category, and Program Sub-Category for a particular time block in different months with different networks and program names.

Figure 4:
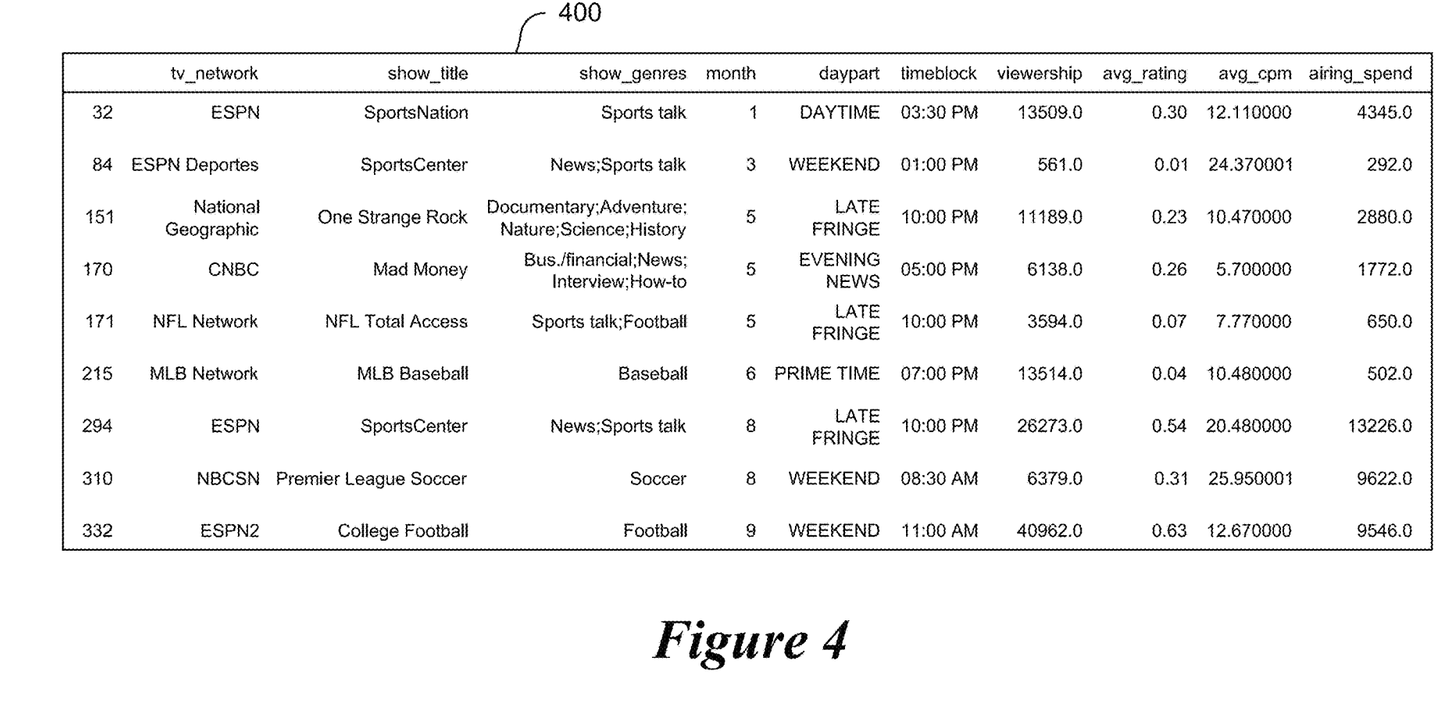
FIG. 4 is a database of media program data for use in preferred embodiments of the present invention.

FIG. 4 shows a portion of contents in database 400 of media program data that includes known ad spend for a subset of media programs, and viewership data for each of the media programs, including total viewership and viewership ratings. Each of the media programs is identified by its respective network, and date and time of airing or streaming. FIG. 4 shows the media program data in the form of a table of information. The information in the table is created from the service provider's raw data for use in the data input steps 102/202. The fields of the table are populated with sample data, including Average Rating (avg_rating), Average CPM (avg_cpm), and Ad Spend (airing_spend). The last value is normalized to "equivalent units" (i.e., 30 second ad spots). Average rating in the table also refers to "viewership ratings" discussed herein. Viewership in the table also refers to "total viewership" discussed herein.

5. Exploratory Data Analysis

Exploratory Data Analysis (EDA) helps determining the underlying structure of the data and extract important and relevant variables that can be used in a model.

Figure 5:
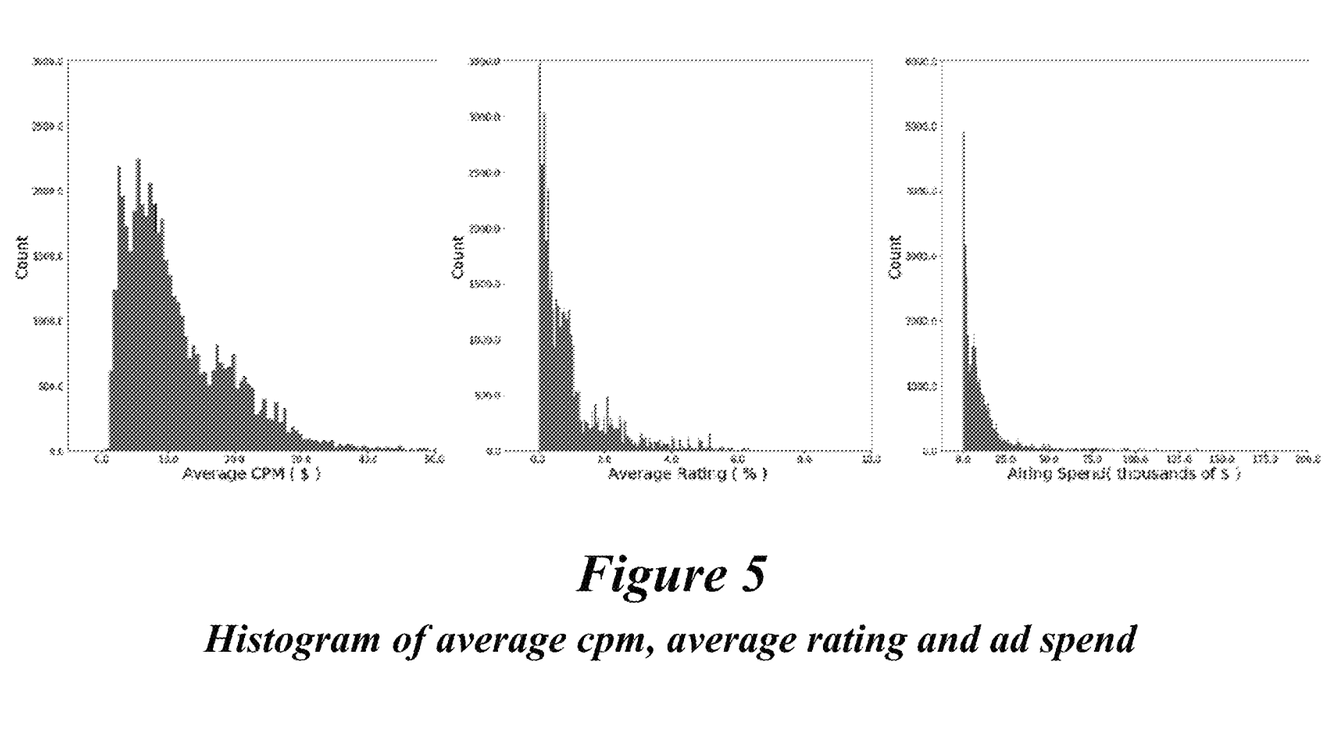
FIG. 5 is a histogram for use in exploratory data analysis in accordance with preferred embodiments of the present invention.

For example, a histogram of average cpm, average rating, airing spend (i.e., ad spend), as illustrated in FIG. 5 shows the following information:
 i. The variables are right skewed. This indicates the presence of outliers. Most of the data is confined within a small range, with the presence of few very high values.
 ii. There are also zero values which can be due to sampling error.

Figure 6:
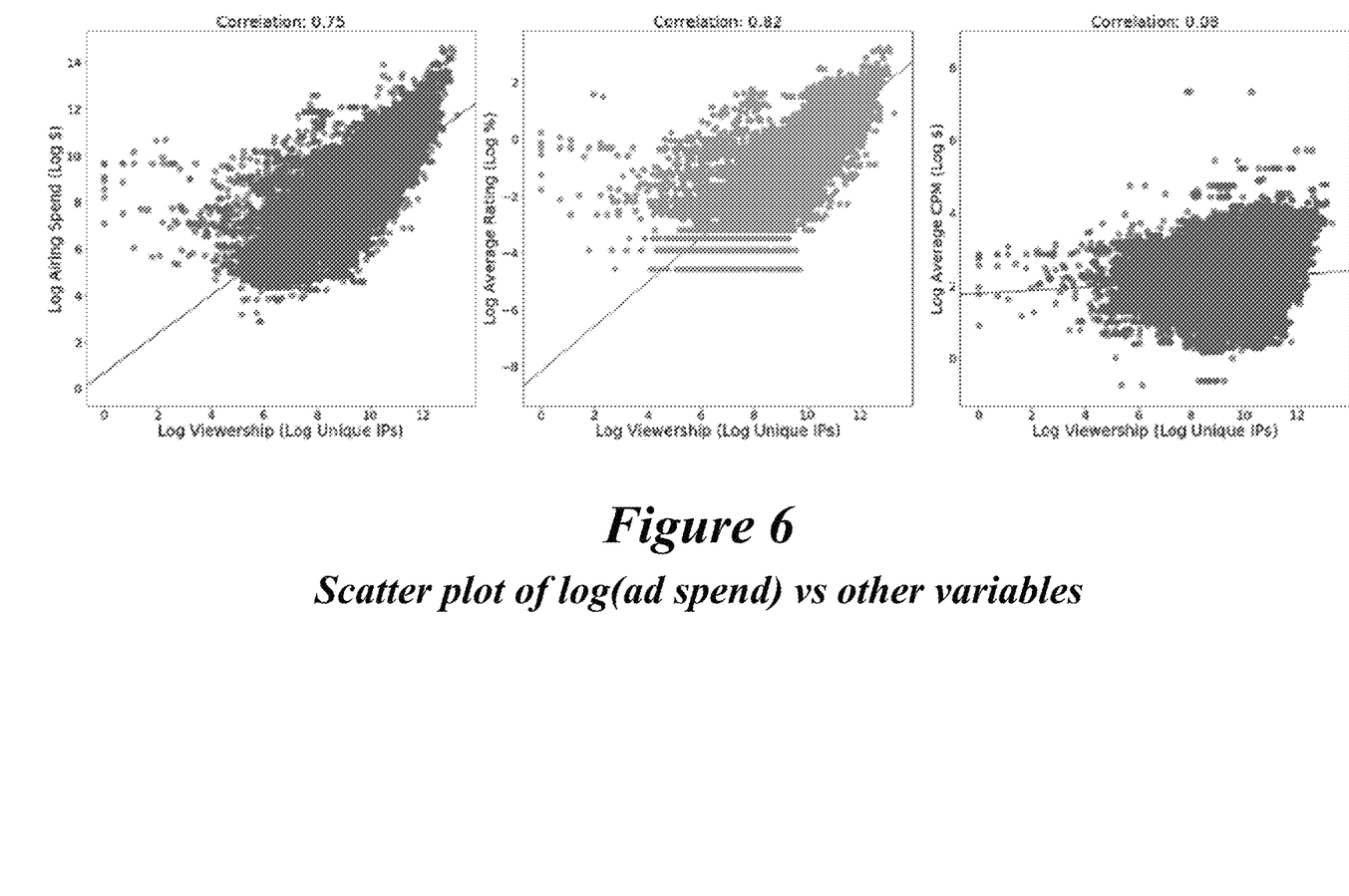
FIGS. 6-8 are plots for use in exploratory data analysis in accordance with preferred embodiments of the present invention.

A scatter plot of log airing spend (i.e., log ad spend) vs log viewership, log airing spend vs log average rating, and log airing spend vs log average cpm as illustrated in FIG. 6 shows the following information:
 i. Viewership seems to be an important feature that might help explain the variability in ad spend and average rating and hence should be used as an input to the model.
 ii. Viewership does not seem to explain variability in average cpm. One possible reason could be because cpm is normalized by impressions.
 iii. Features are log transformed for the ease of comparisons.

Figure 7:
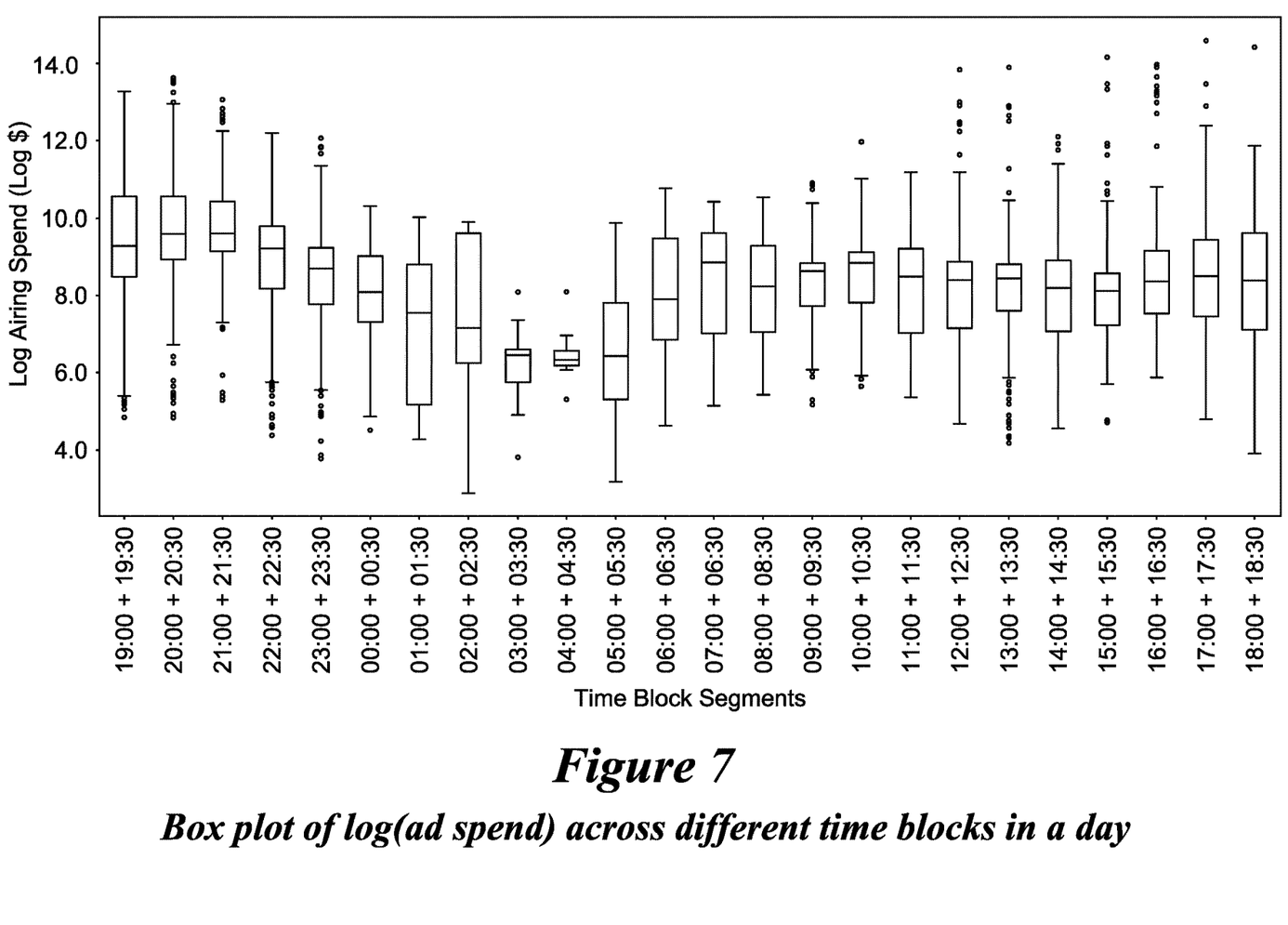

Similarly, a box plot of log airing spend (i.e. log ad spend) across different time blocks of a day illustrated in FIG. 7 shows the following information:
 i. Distribution of ad spend changes across time blocks. Median of log ad spend follows a pattern across the various time block segments in the plot above. Hence, it might be beneficial to include time block as a feature to model ad spend.
 ii. The ad spend is log transformed for the ease of viewing the distribution.

Figure 8:
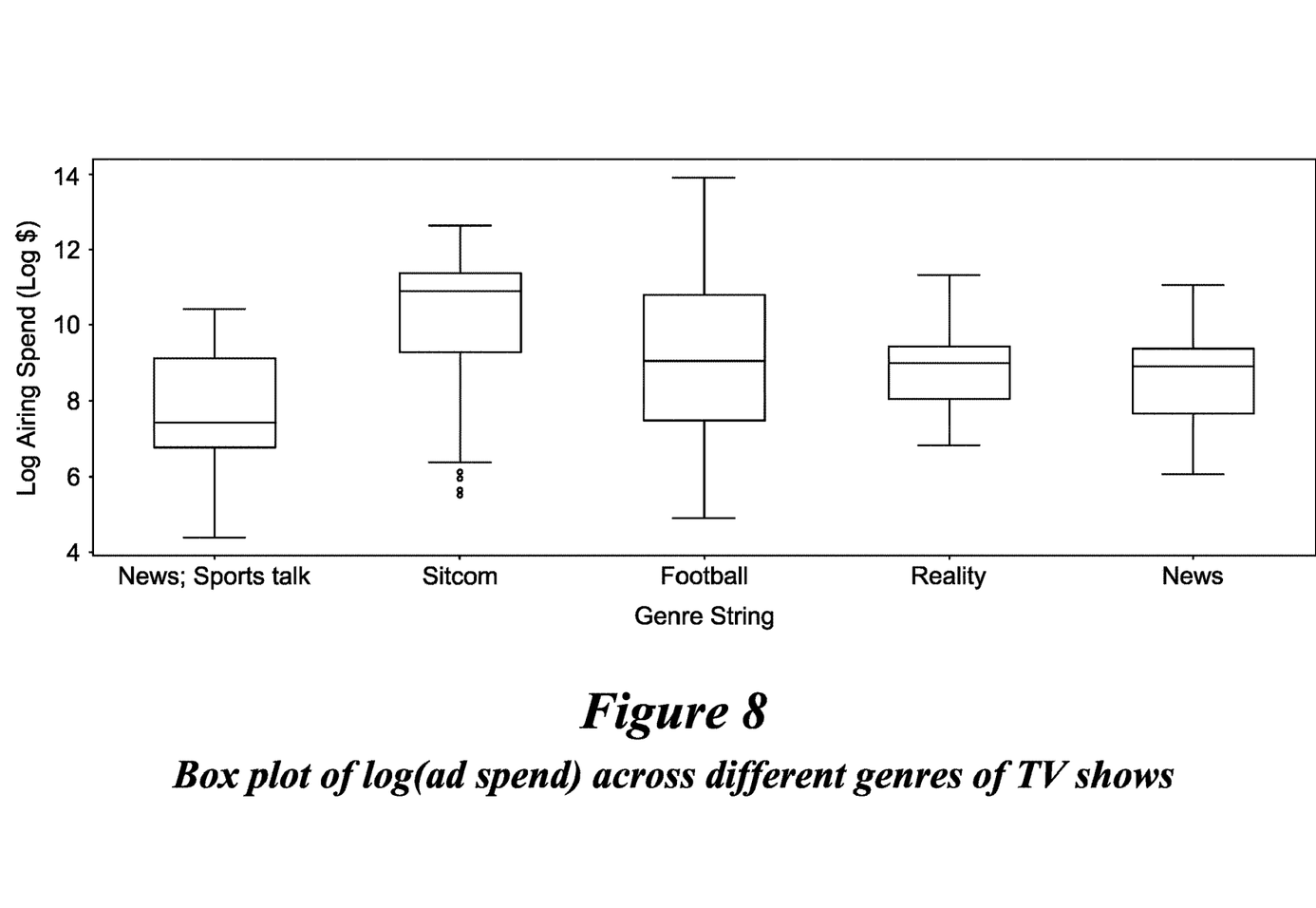

Another example of EDA is a box plot of log airing spend (i.e., log ad spend) across top 5 most occurring genres, illustrated in FIG. 8. Based on the plot, the following information can be concluded:
 i. There is visible variation of log ad spend across different genres.

ii. Genres help explain some of the variability in ad spend and hence should be used as an input to the model.

6. Feature Engineering

Feature Engineering is transformation of the prospective inputs or the independent variables identified after EDA, either to encode them in a certain way for the model to understand it or to amplify the signals present in them to help explain the outcome variable better. This makes the modeling techniques/algorithms work better.

For example, EDA showed us that "genre" of a show is a useful feature that should be used as an input to the model. However, there are more than one hundred genres and using every single genre makes the model extremely complex, potentially leading to a high variance model that would not generalize well across different/new datasets.

Figure 9:
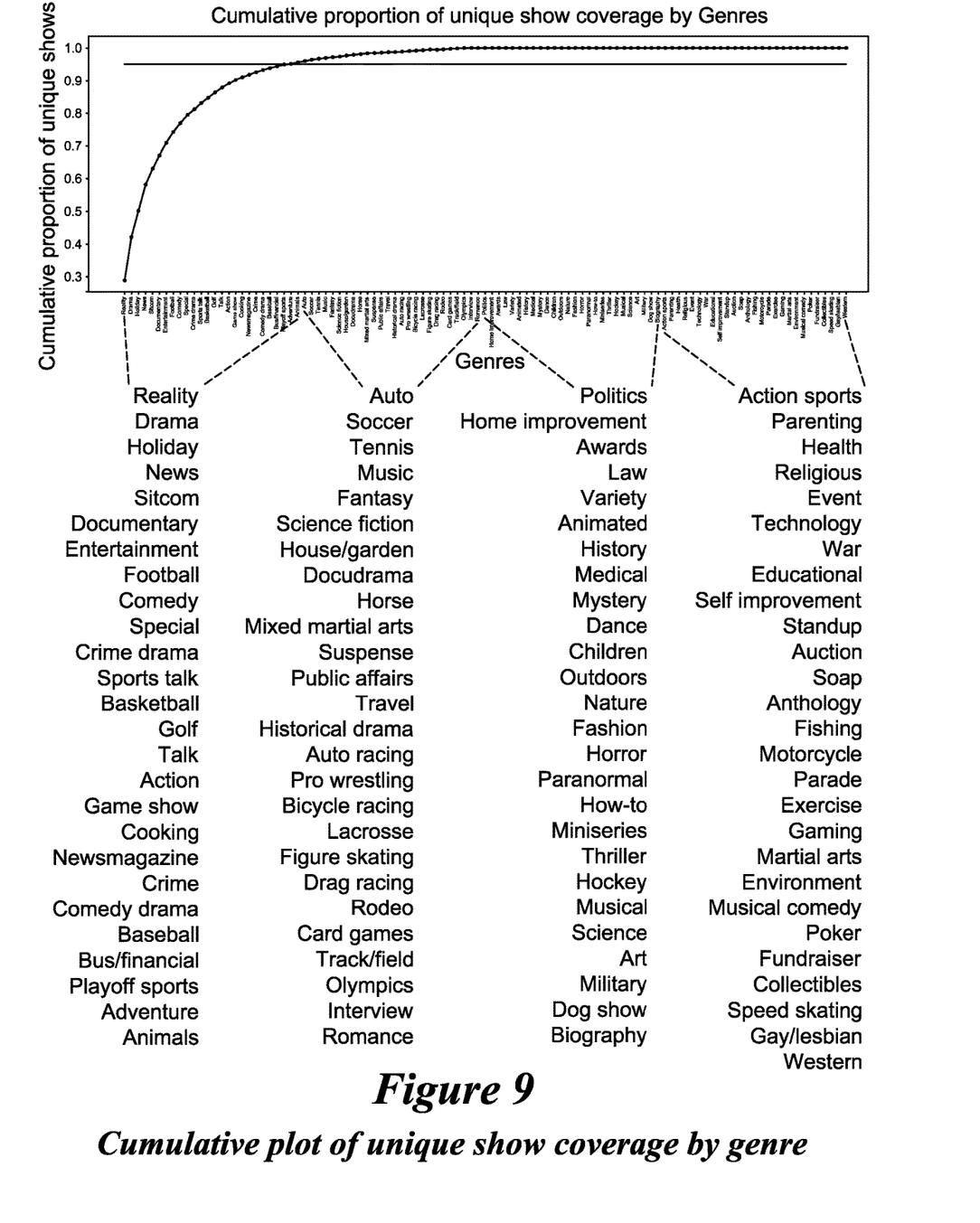
FIGS. 9 and 10 are plots for use in feature engineering in accordance with preferred embodiments of the present invention.

A cumulative plot of unique show coverage by genres is illustrated in FIG. 9 and shows the following information:

i. About 24 genres cover 95% of the total shows. Hence, instead of using all of 100+ genres, these 24 genres can be used in the model to reduce its complexity and improve its performance.

ii. A 25th "other" genre can capture all of the remaining genres.

Similarly, based on EDA, ad spend has been shown to vary across different time blocks of a day. It also varies across different networks. For example, ad spend at 9 pm on NBC will be very different than ad spend at 9 pm on HGTV. Since there are hundreds of networks, encoding and incorporating this information into the model is a challenge.

Figure 10:
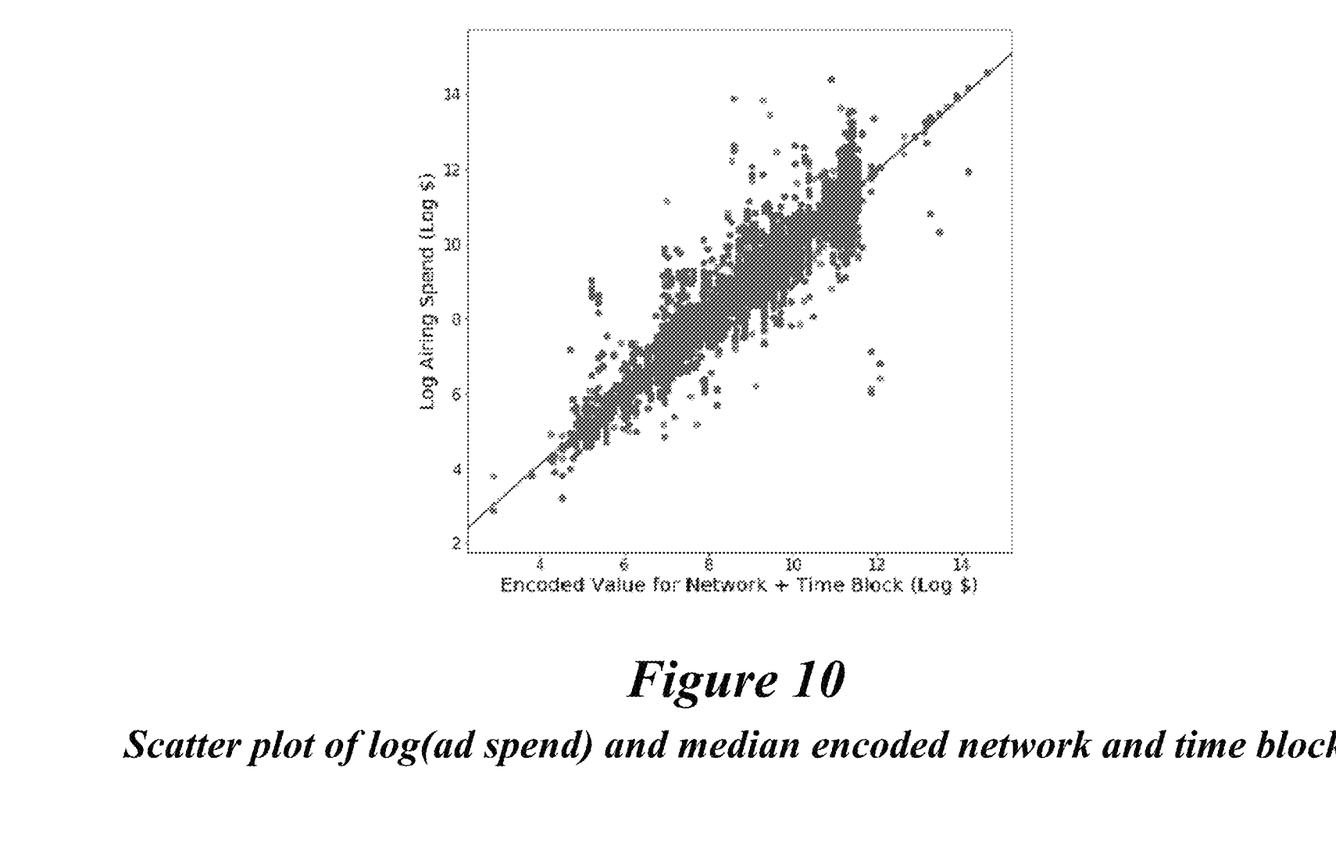

After experimentation, it has been found that the median of log(ad spend) for a network at a particular time block is a good proxy for that network and time block feature combination, as can be seen from the strong correlation in FIG. 10. Hence network and time block combination was encoded using the median of the target variable.

7. Random Forest Model Training

As background to the model process, every model has a Train set, a set of Parameters, a set of Hyper-parameters and a Measurement-metric. To learn a model, a train set and different sets of hyper-parameters are provided. Based on a Measurement metric, parameters are output. The following detailed explanations are provided regarding the model process.

i. Parameters: These are the model specifications that are learned from the training data.

ii. Hyperparameters: These are the model specifications that are provided before training the model. This requires manual tuning.

iii. Train Set: This sample of data is used to learn the model parameters.

iv. Validation Set: This data set is used to tune hyper-parameters and obtain an estimate of the model Generalization Error.

v. Test Set: This sample of data is used to provide an estimate of Prediction Error of the finally built model for the purpose of reporting.

Preferred embodiments of the present invention use a random forest model. A random forest is a collection of decision trees. Every tree is built by bootstrapping samples from the train set and taking a small subset of randomly sampled features from a feature set. This is known as "ensembling." A final result is chosen by averaging the output of every tree. Random forest is a non-parametric model that has no fixed definition of parameters. Hyperparameters include the number of trees, maximum features, and maximum depth of each tree.

8. System Architecture

Figure 11:
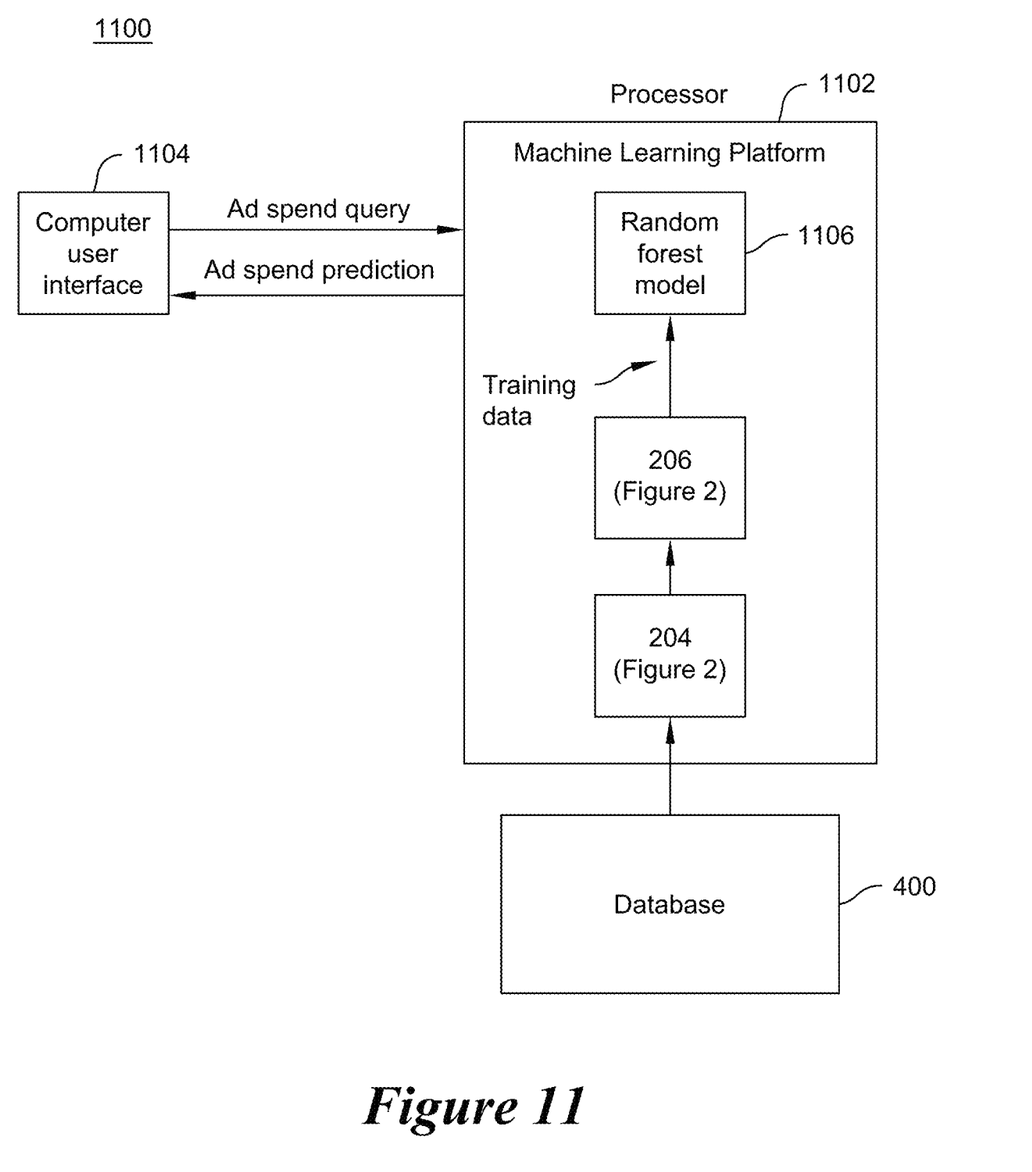
FIG. 11 shows system architecture for implementing one preferred embodiment of the present invention.

FIG. 11 shows system architecture 1100 for implementing one preferred embodiment of the present invention. The system architecture 1100 includes processor 1102, the database 400 of FIG. 4, and computer user interface 1104. The processor 1102 includes a machine learning platform, here, random forest model 1106 which is trained using training data that is obtained by processing the data in the database 400 in accordance with steps 204 (exploratory data analysis) and 206 (feature engineering) of FIG. 2. Once trained, ad spend queries may be requested by the computer user interface 1104 and ad spend predictions are returned in response thereto.

The present invention can also be included in an article of manufacture (e.g., one or more non-transitory, tangible computer program products) having, for instance, computer readable storage media. The storage media has non-transitory computer readable program code (non-transitory computer-executable program instructions) stored therein that is encoded with instructions for execution by a processor (here, processor 1102) for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The processor 1102 is not a general-purpose computer, but instead is a specialized computer machine that perform a myriad of functions shown in FIGS. 1-3 that are not native to a general-purpose computer, absent the addition of specialized programming to allow for a machine learning environment. The details of a machine learning platform and the random forest model are well-known in the art, and thus are not further described herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer program product for predicting ad spend for a specific media program aired or streamed on a specific network at a specific date and time using a database of media program data that includes (i) known ad spend for a subset of media programs, and (ii) viewership data for each of the media programs, including total viewership and viewership ratings, wherein each of the media programs is identified by its respective network, and date and time of airing or streaming, and wherein ad spend is an amount of money spent on advertising for a product or service, the computer program product comprising a computer readable medium tangibly embodying non-transitory computer-executable program instructions thereon that, when executed, cause one or more computing devices in a machine learning platform to:
- (a) perform data analysis on the media program data to identify one or more variables, or combinations of variables, that correlate with ad spend, the ad spend being the amount of money spent on advertising for a product or service;
- (b) perform feature engineering on the identified one or more variables, or the combinations of variables to identify a subset of one or more variables, or combinations of variables, that provide the greatest explanatory value;
- (c) train a random forest model to predict ad spend using the identified subset of one or more variables, or the combinations of variables, the random forest model including a random forest having a plurality of individual decision trees; and
- (d) predict ad spend for a specific media program that is aired or streamed on a specific network at a specific date and time, and which has an unknown ad spend, using the trained random forest model, wherein the predicted ad spend is an average of ad spend predicted from the individual decision trees of the random forest, wherein the total viewership is captured using unique IP addresses of devices that viewed respective media programs.

* * * * *